United States Patent
Mathieu, Jr.

[11] Patent Number: 5,497,965
[45] Date of Patent: Mar. 12, 1996

[54] RELEASABLE MICROPHONE STAND APPARATUS

[76] Inventor: Edward F. Mathieu, Jr., 21 Pine Ct., South Elgin, Ill. 60177

[21] Appl. No.: 250,386

[22] Filed: May 27, 1994

[51] Int. Cl.$^6$ ................................................ F16M 13/00
[52] U.S. Cl. .................... 248/159; 403/327; 411/508; 411/913
[58] Field of Search ...................... 248/159, 158, 248/681; 411/508, 509, 510, 913, 348; 403/330, 327, 326

[56] References Cited

U.S. PATENT DOCUMENTS

| | | | |
|---|---|---|---|
| 3,573,401 | 4/1971 | Lininger | 179/147 |
| 4,708,895 | 11/1987 | Mizusawa | 411/913 X |
| 4,718,624 | 1/1988 | Greulich | 248/158 |
| 4,927,287 | 5/1990 | Ohkawa et al. | 411/510 X |
| 5,046,693 | 9/1991 | Browne | 248/159 |

*Primary Examiner*—Ramon O. Ramirez
*Attorney, Agent, or Firm*—David L. Baker; Henry S. Miller; Rhodes & Ascolillo

[57] ABSTRACT

An apparatus for releasably locking a microphone stand tube to a microphone base has a lock member receiver threadingly attached to the microphone base. A locking coupling has a first end threadingly attached to the microphone stand tube. A lock member has a coupling end connected to a second end of the locking coupling and a locking retainer releasably locked into the locking receiver. The lock member has a locking actuator arm. A locking arm is connected to the locking actuator arm and pivotally connected to the locking retainer. There is a securing hook attached to the locking arm. The securing hook releasably engages an end of the lock member receiver. There is a spring receiving chamber in the locking retainer. A lock spring has an end removably placed in the spring retaining chamber and another end abutting the locking arm. The male exterior surface is octagon in shape and a female interior surface of the lock member receiver is octagon in shape to receive the male exterior surface of the lock member.

5 Claims, 3 Drawing Sheets ns
RELEASABLE MICROPHONE STAND APPARATUS

BACKGROUND OF THE INVENTION

1. Field of the Invention

This invention relates, in general, to a microphone stand apparatus and, in particular, to a microphone stand assembly that has a pole securely attached yet easily releasable from the stand.

2. Description of the Related Art

In the past, microphone stand tubes were threaded into the microphone base. As time wore on, the threads were often worn or damaged causing the user to have to replace the entire unit. Previous patents have tried to solve this problem in various ways. However, these devices did not provide the stability, ease of removal/insertion and the ability to place the stand tube in the base so as to allow the microphone to face in different directions without moving the heavy base.

U.S. Pat. No. 3,573,401 to T. C. Lininger on Apr. 06, 1971 for a Microphone Stand describes a stand for use on a desk or table. The stand has a circular, elastomeric body with annular grooves into which a stub member is inserted. The elastomeric body provides shock and vibration protection.

U.S. Pat. No. 4,718,624 to R. G. Greulich on Jan. 12, 1988 for a Folding Microphone Stand shows a stand tube that is pivotally supported in a heavy cast base. There is a locking means such as a locking pin, a rotating locking cone or a locking collar.

U.S. Pat. No. 5,046,693 to W. A. Browne on Sep. 12, 1991 for a Microphone Stand Coupler describes a coupler that is inserted through an opening in the base and secured to the base by way of an over-center cam lever attached to the coupler.

The present invention has solved these problems by providing a releasable microphone stand apparatus having a locking mechanism easily activated by hand or foot that allows the user to lock the stand tube in several different directions.

SUMMARY OF THE INVENTION

The present invention is designed to solve a problem inherent in the use of conventional microphone stands. Conventional stands have a tubular stand mounted onto a base by threads. For occasional use, this generally does not present a problem. However, for a stand that is subjected to frequent use, the threads often become worn and damaged. The present invention provides an apparatus that allows a conventional stand to be converted or provides a new stand with additional attractive features.

In one aspect of the present invention, an apparatus for releasably locking a microphone stand tube to a microphone base is described that has a lock member receiver attached to the microphone base. There is a locking coupling having a first end attached to the microphone stand tube. A lock member has a coupling end connected to a second end of the locking coupling and a locking retainer releasably locked into the lock member receiver.

The lock member has a locking actuator arm. A locking arm is connected to the locking actuator arm and is pivotally connected to the locking retainer. There is a securing hook attached to the locking arm. The securing hook releasably engages an end of the lock member receiver.

In a second aspect of the invention, an apparatus for releasably locking a microphone stand tube to a microphone base is described. A lock member receiver is threadingly attached to the microphone base. A locking coupling has a first end threadingly attached to the microphone stand tube. A lock member has a coupling end connected to a second end of the locking coupling and has a locking retainer releasably locked into the lock member receiver. The lock member has a locking actuator arm. There is a locking arm connected to the locking actuator arm. The locking arm is also pivotally connected to the locking retainer of the lock member. There is a securing hook attached to the locking arm. The securing hook releasably engages an end of the lock member receiver.

It is an object of this invention to provide a microphone stand tube that can be quickly released from a microphone stand and reinserted with ease as the need arises.

It is another object of this invention to provide a microphone stand tube that can be easily and quickly released and reinserted in a plurality of positions to face the microphone in a different direction.

DESCRIPTION OF THE PREFERRED EMBODIMENT

Figure 1:
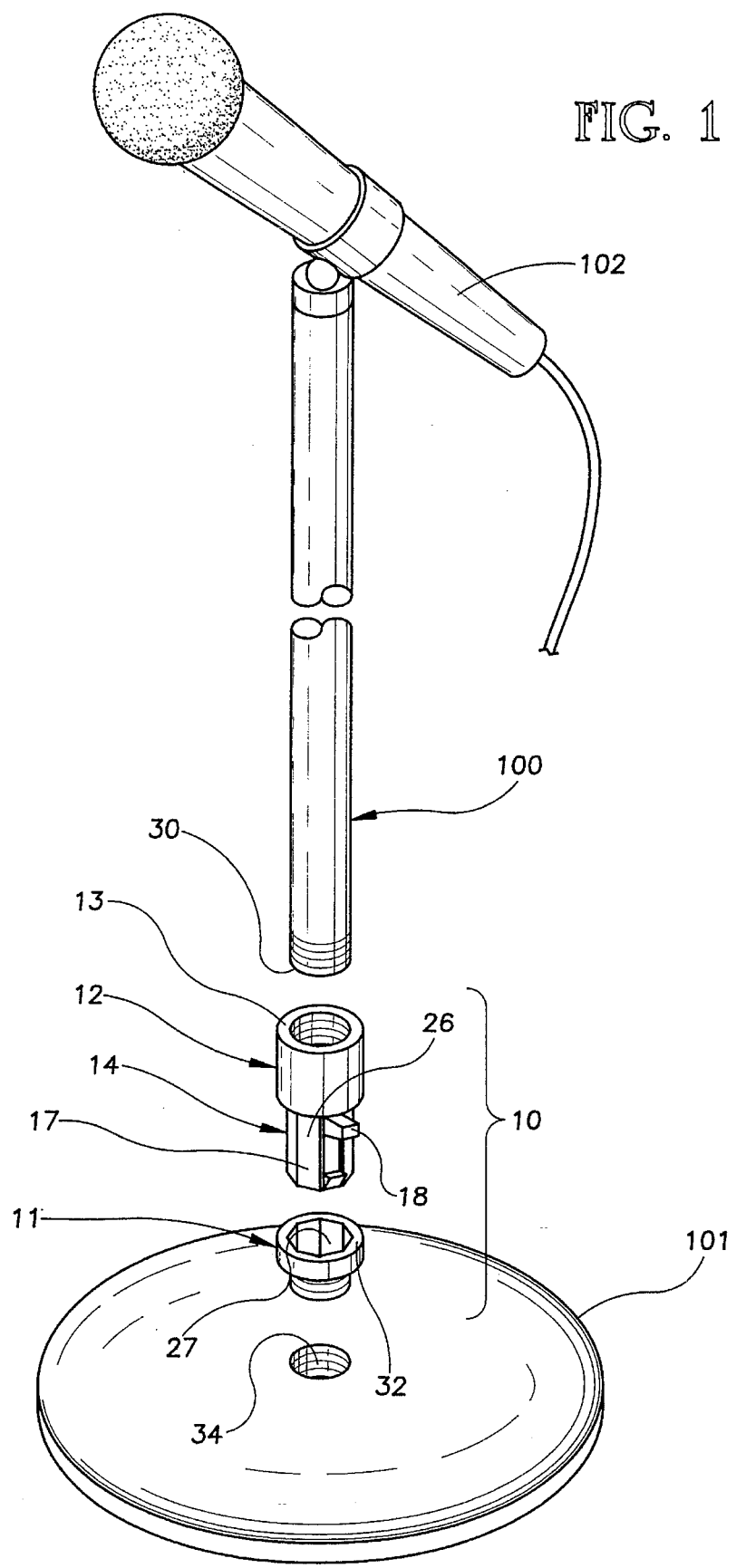
FIG. 1 is an exploded, perspective view of the Releasable Microphone Stand Apparatus.
Figure 2:
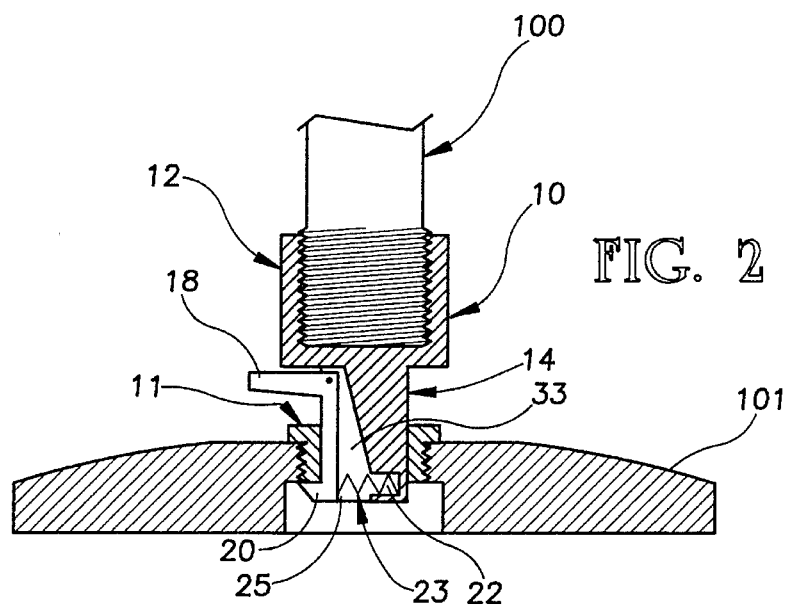
FIG. 2 is partial cross-sectional front elevational view showing the lock member, in the microphone base, in the fully locked position.
Figure 3:
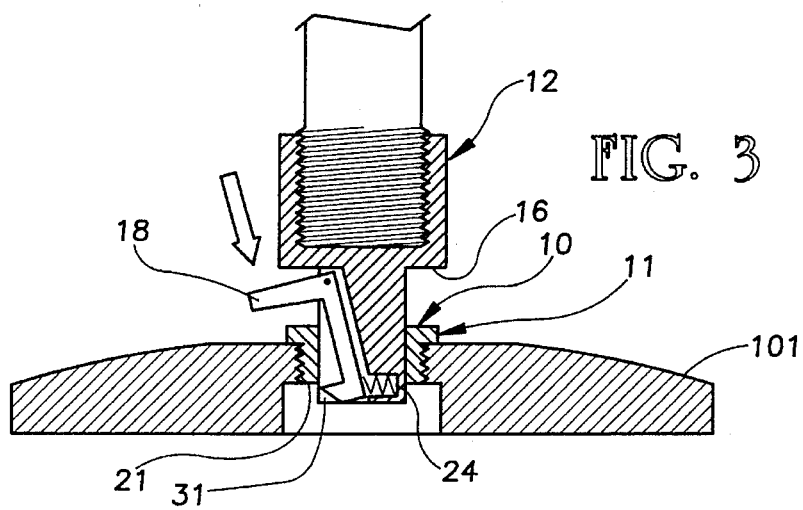
FIG. 3 is partial cross-sectional front elevational view showing the lock member in the microphone base and showing the locking arm moving the securing hook to the fully unlocked position.
Figure 4:
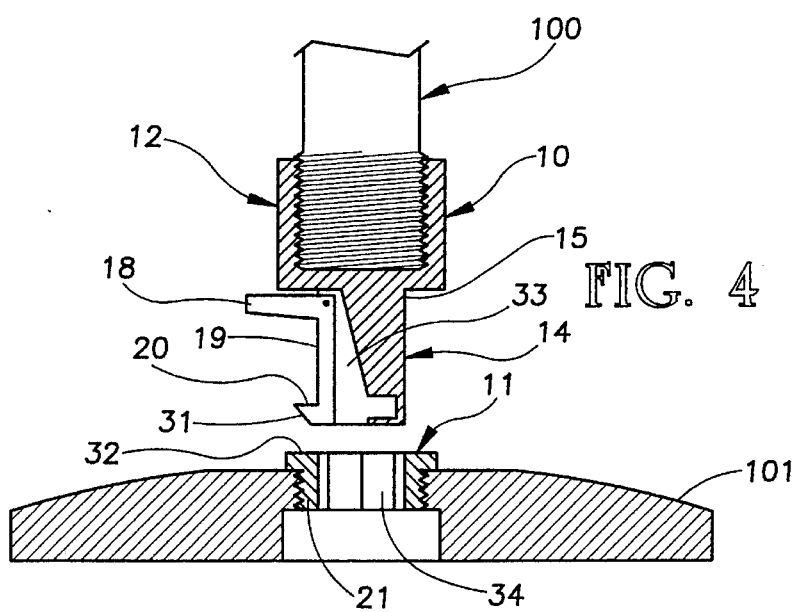
FIG. 4 is partial cross-sectional front elevational view showing the lock member withdrawn from the lock member receiver of the microphone stand. The lock member receiver has a female interior surface of the lock member receiver that is octagon in shape and a female interior surface of the lock member receiver that is octagon in shape to receive the male exterior surface of the lock member.
Figure 5:
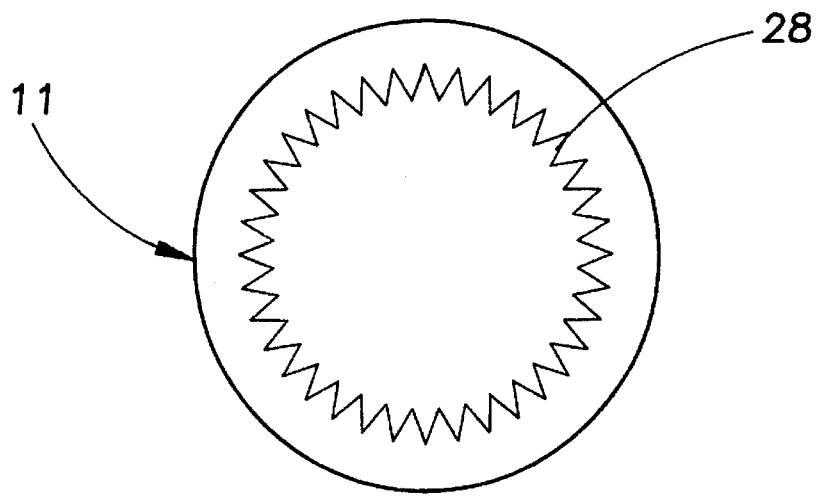
FIG. 5 is a top plan view of a lock member receiver with a female interior surface of the lock member receiver has a plurality of interior grooves to receive the male exterior surface of the lock member that has a plurality of external splines.
Figure 6:
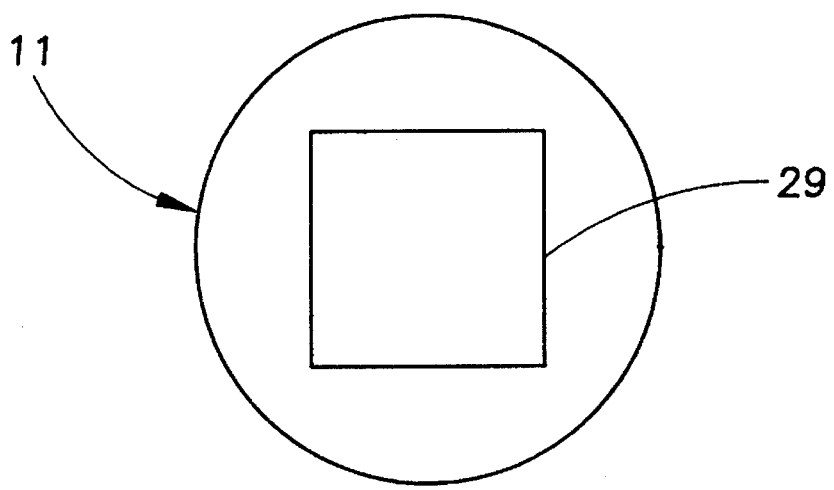
FIG. 6 is a top plan view of a lock member receiver with a female interior surface of the lock member receiver that has four substantially equal sides to receive the male exterior surface of the lock member that has four substantially equal sides.

Referring to FIGS. 1 through 6, an apparatus 10 for releasably locking a microphone stand tube 100 to a microphone base 101 is shown and described that has a lock member receiver 11 threadingly attached to the microphone base 101. A locking coupling 12 has a first end 13 threadingly attached to the microphone stand tube 100. There is a lock member 14 that has a coupling end 15 connected to a second end 16 of the locking coupling 12 and a locking retainer 17 releasably locked into the locking receiver member 11. The lock member 14 has a locking actuator arm 18. A locking arm 19 is connected to the locking actuator arm 18 and pivotally connected to the locking retainer 17. There is a securing hook 20 attached to the locking arm 19. The securing hook 20 releasably engages an end 21 of the lock member receiver 11. There is a spring receiving chamber 22 in the locking retainer 17. A lock spring 23 has an end 24 removably placed in the spring retaining chamber 22 and another end 25 abutting the locking arm 19.

There is a male exterior surface 26 of the lock member. Preferably the male exterior surface is octagon (see FIG. 1) in shape and a female interior surface 27 of the lock member receiver 11 is octagon in shape (see FIG. 1) to receive the male exterior surface 26 of the lock member. However, the male exterior surface 26 of the lock member 14 may have a plurality of external splines (not shown) and a female interior surface of the lock member receiver 11 may have a plurality of interior grooves 28 (see FIG. 5) to receive this different Version of the male exterior surface of the lock member. The male exterior surface 26 of the lock member 14 may, as an alternative, have four substantially equal sides (not shown) and a female interior surface of the lock member receiver may have four substantially equal sides 29 (see FIG. 6) to receive the alternative male exterior surface of the lock member.

In operation, the standard microphone stand tube 100, with or without a microphone 102 attached, is unscrewed from the microphone base 101 and a locking coupling 12 having a lock member 14 on its second end 16 is threaded onto the proximate end 30 of the stand tube 100. A lock member receiver 11 is then threaded into the microphone base 101. Once this is done, the lock member 14 can be inserted into the lock member receiver 11. As the sloped edge 31 of the securing hook 20 strikes the receiving end 32 of the lock member receiver 11, the securing hook 20 is pushed into a slot 33 in the locking member 14 compressing the lock spring 23. This allows the lock member 14 to enter the locking port 34 through the lock member receiver 11. Once the lock member 14 is fully seated within the lock member receiver 11, the lock spring 23 forces the securing hook 20 to releasingly engage the end 21 of the lock member receiver 11. To release the lock member 14 from the lock member receiver 11, the user may, either by hand or foot, press the locking actuator arm 18 down causing the securing hook 20 to disengage from the locking end 21 of the lock member receiver 11. Once this is done, the lock member 14 can be lifted out of the lock member receiver 11. To reinsert the lock member 14 into the lock member receiver 11, the lock member 14 is simply pushed into locking port 34 until securing hook 20 engages an end 21 of the lock member receiver 11.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. An apparatus for releasably locking a microphone stand tube to a microphone base comprising:

(a) a lock member receiver attached to the microphone base;

(b) a locking coupling having a first end attached to the microphone stand tube; and (c) a lock member, having a coupling end connected to a second end of the locking coupling and a locking retainer releasably locked into the lock member receiver, comprising:

a locking actuator arm;

a locking arm connected to the locking actuator arm and pivotally connected to the locking retainer;

a securing hook attached to the locking arm;

the securing hook releasably engaging an end of the lock member receiver;

a male exterior surface of the lock member is octagon in shape; and a female interior surface of the lock member receiver is octagon in shape to receive the male exterior surface of the lock member.

2. An apparatus for releasably locking a microphone stand tube to a microphone base comprising:

(a) a lock member receiver threadingly attached to the microphone base;

(b) a locking coupling having a first end threadingly attached to the microphone stand tube; and (c) a lock member, having a coupling end connected to a second end of the locking coupling and a locking retainer releasably locked into the lock member receiver, comprising:

a locking actuator arm;

a locking arm connected to the locking actuator arm and pivotally connected to the locking retainer;

a securing hook attached to the locking arm;

the securing hook releasably engaging an end of the lock member receiver;

a spring receiving chamber in the locking retainer; and a lock spring having an end removably placed in the spring retaining chamber and another end abutting the locking arm.

3. An apparatus for releasably locking a microphone stand tube to a microphone base comprising:

(a) a lock member receiver attached to the microphone base;

(b) a locking coupling having a first end attached to the microphone stand tube; and (c) a lock member, having a coupling end connected to a second end of the locking coupling and a locking retainer releasably locked into the lock member receiver, comprising:

a locking actuator arm;

a locking arm connected to the locking actuator arm and pivotally connected to the locking retainer;

a securing hook attached to the locking arm;

the securing hook releasably engaging an end of the lock member receiver;

a male exterior surface of the lock member; and a female interior surface of the lock member receiver to receive the male exterior surface of the lock member.

4. An apparatus as described in claim 3 wherein the male exterior surface of the lock member has four substantially equal sides and the female interior surface of the lock member receiver has four substantially equal sides to receive the male exterior surface of the lock member.

5. An apparatus as described in claim 3 wherein the male exterior surface of the lock member has a plurality of external splines and the female interior surface of the lock member receiver has a plurality of interior grooves to receive the male exterior surface of the lock member.

* * * * *